(12) United States Patent
Blevins et al.

(10) Patent No.: US 7,877,154 B2
(45) Date of Patent: Jan. 25, 2011

(54) METHOD AND SYSTEM FOR CONTROLLING A BATCH PROCESS

(75) Inventors: Terrence L. Blevins, Round Rock, TX (US); Gregory K. McMillan, Austin, TX (US); Michael A. Boudreau, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 553 days.

(21) Appl. No.: 11/241,157

(22) Filed: Sep. 30, 2005

(65) Prior Publication Data

US 2007/0078530 A1    Apr. 5, 2007

(51) Int. Cl.
G05B 13/02 (2006.01)
(52) U.S. Cl. ............................ 700/31; 700/29; 700/52; 700/53
(58) Field of Classification Search ............. 700/29–32, 700/52, 53, 44, 45, 46; 703/2
See application file for complete search history.

(56) References Cited

U.S. PATENT DOCUMENTS

| | | | |
|---|---|---|---|
| 6,445,963 B1 | 9/2002 | Blevins et al. | |
| 6,721,609 B1 | 4/2004 | Wojsznis et al. | |
| 6,760,716 B1 * | 7/2004 | Ganesamoorthi et al. | ..... 706/21 |
| 6,901,308 B1 | 5/2005 | Hamada et al. | |
| 2002/0107604 A1 | 8/2002 | Riley et al. | |
| 2004/0049299 A1 | 3/2004 | Wojsznis et al. | |
| 2004/0243380 A1 * | 12/2004 | Blevins et al. | ................. 703/22 |
| 2004/0249483 A1 * | 12/2004 | Wojsznis et al. | ............... 700/31 |
| 2005/0154477 A1 | 7/2005 | Martin et al. | |
| 2006/0058899 A1 * | 3/2006 | Boyden et al. | ................. 700/44 |

FOREIGN PATENT DOCUMENTS

| | | |
|---|---|---|
| CN | 1416540 A | 5/2003 |
| WO | WO-01/46762 | 6/2001 |
| WO | WO-01/67189 | 9/2001 |
| WO | WO 01/67189 A1 | 9/2001 |

OTHER PUBLICATIONS

U.S. Appl. No. 09/510,053, filed Feb. 22, 2000, Nixon et al.
Search Report for Application No. GB0618442.8, dated Jan. 18, 2007.
L. Rueda, "Modeling and Control of Multicomponent Distillation Systems Separating Highly Non-Ideal Mixtures", Dissertation, University of Texas at Austin (2005).
L. Rueda et al., "On-line Parameter Estimation and Control for a Pilot Scale Distillation Column," Presented at AIChE Annual Meeting, Austin, TX (Nov. 2004).

(Continued)

Primary Examiner—Albert DeCady
Assistant Examiner—Steven R Garland
(74) Attorney, Agent, or Firm—Marshall, Gerstein & Borun LLP

(57) ABSTRACT

A first principles model may be used to simulate a batch process, and the first principles model may be used to configure a multiple-input/multiple-output control routine for controlling the batch process. The first principles model may generate estimates of batch parameters that cannot, or are not, measured during operation of the actual batch process. An example of such a parameter may be a rate of change of a component (e.g., a production rate, a cell growth rate, etc.) of the batch process. The first principles model and the configured multiple-input/multiple-output control routine may be used to facilitate control of the batch process.

25 Claims, 10 Drawing Sheets

OTHER PUBLICATIONS

First Office Action for corresponding Chinese Application No. 200610131751.2, dated Jan. 8, 2010.

Combined Search and Examination Report under Sections 17 and 18(3) issued in GB1008266.7 application by United Kingdom Patent Office dated Jun. 7, 2010.

Examination Report for Great Britain Application No. 0618442.8, dated Aug. 27, 2009.

Combined Search and Examination Report for Great Britain Application No. 1003382.7, dated Mar. 22, 2010.

* cited by examiner

METHOD AND SYSTEM FOR CONTROLLING A BATCH PROCESS

TECHNICAL FIELD

This invention relates generally to process control systems and, more particularly, to systems for controlling and/or modeling batch processes.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or of other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

In any event, the process controllers (or field devices) are typically programmed to execute a different algorithm, sub routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single output control block, such as a PID or a fuzzy logic control function block, and a single output block, such as an analog output (AO) function block. These control loops typically perform single input/single output control because the control block creates a single output used to control a single process input, such as a valve position, etc. However, in certain cases, the use of a number of independently operating, single input/single output control loops is not very effective because the process variables or process outputs being controlled are effected by more than a single process input and, in fact, each process input may effect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby effecting the temperature and causing the temperature control loop to take some other action. As will be understood in this example, the single input/single output control loops may cause the process outputs (in this case, throughput, temperature and pressure) to oscillate without ever reaching a steady state condition, which is undesirable.

Model predictive control (MPC) or other types of advanced control have been used in the past to perform control in these types of situations. Generally speaking, model predictive control is a multiple input/multiple output control strategy in which the effects of changing each of a number of process inputs on each of a number of process outputs is measured and these measured responses are then used to create a typically linear model of the process. The linear model of the process is inverted mathematically and is then used as a multiple input/multiple output controller to control the process outputs based on changes made to the process inputs. In some cases, the process model includes a process output response curve for each of the process inputs and these curves may be created based on a series of, for example, pseudo random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," AIChE Conference, 1996. Furthermore, U.S. Pat. No. 6,445,963, the disclosure of which is hereby expressly incorporated by reference herein, discloses a method of integrating a model predictive control block into a process control system for use in controlling a process.

Processes can be generally classified into three categories: continuous processes, semi-continuous processes, and batch processes. A continuous process is one which operates on raw materials or feed elements at a continuous rate to produce a continuous stream of product at an output. Examples of continuous processes include petroleum refining processes, vitamin C production processes and certain commodity chemical manufacturing processes. The values of process variables, such as temperature, pressure, flow rate, etc., typically remain the same over time at any location within a continuous process.

A batch process is a process which operates on a limited quantity of raw materials or feed elements as a group and which forces those feed elements through a series of process steps over time to produce an output product at the completion of the process steps. Usually, no new feed elements are introduced into a batch process during operation of the process steps. Examples of batch processes include the manufacture of beer, the manufacture of some pharmaceutical drugs and the production of many specialty chemicals. The values of process variables, such as temperature, pressure, flow rate, etc., typically change over time at one or more locations within a batch process.

A semi-continuous process is a continuous process which has batch process components therein. Typically, a semi-continuous process operates on a continuous supply of raw materials to produce a continuous stream of output product but has a set of, for example, mixers which mix a limited quantity of the materials being processed for a limited time somewhere within the process.

With regard to batch processes (and batch process components of semi-continuous processes), pertinent process variables often cannot be measured during operation of the process or cannot be measured in time period short enough to allow the measurement to be used to adjust the process. For example, in order to measure a concentration of penicillin being produced in a vessel during the production process, a sample is withdrawn from the vessel and then sent to a laboratory for analysis. Results from the laboratory analysis may not be available for some time after the sample was taken, and even may not be available until after the batch process was completed. Thus, such measurements are often not useful for adjustments during the process to, for example, increase the yield of the batch, speed completion of the batch, etc. Also, such measurements may not be timely enough to allow prematurely ending the batch because of poor quality, extending the batch process to increase the yield, etc.

In one typical approach for operating a batch process, an operator may record process conditions that occurred during a successful batch process. Then, in subsequent batch processes, the operator may try to precisely maintain batch process conditions close to those of the known successful batch process. In this approach, it is assumed that the final batch process state should be close to that of the known successful batch process if the batch process conditions are maintained close to that of the known successful batch process. Other unmeasured conditions or conditions that cannot be precisely controlled, however, may affect the final batch process state. Therefore, even if many batch process conditions are precisely maintained, the final result of the batch process may vary from that of the known successful batch process.

A mathematical equation or equations (i.e., a parametric model) may be developed to estimate a rate of reaction of a process, where the equation is a function of measured process conditions. Development of such an equation that takes into account many process conditions, however, is usually extremely difficult. Often, the developed equation is simplified by making various assumptions, resulting in an equation that provides only a rough approximation of the rate of reaction. Accordingly, any estimate of the current state of the batch process based on such an equation may provide only a rough approximation of the current state of the batch process. Further, equipment conditions and other conditions related to the batch process may change over time. Thus, estimates generated by the equation may become less accurate with time.

SUMMARY OF THE DISCLOSURE

A first principles model may be used to simulate a batch process, and the first principles model may be used to configure a multiple-input/multiple-output control routine for controlling the batch process. The first principles model may generate estimates of batch parameters that cannot, or are not, measured during operation of the actual batch process. An example of such a parameter may be a rate of change of a component (e.g., a production rate, a cell growth rate, etc.) of the batch process. The first principles model and the configured multiple-input/multiple-output control routine may be used to facilitate control of the batch process.

For example, the first principles model and the configured multiple-input/multiple-output control routine could be used simulate control of the batch process. This may help to develop control strategies for controlling the actual batch process, develop strategies for detecting abnormal situations associated with the batch process, etc. Additionally, the first principles model could be used during control of the actual batch process. For example, the estimates of batch parameters that cannot, or are not, measured during operation of the actual batch process could be used for controlling the batch process, for predicting an end time, for predicting a product yield, etc.

DETAILED DESCRIPTION

Figure 1:
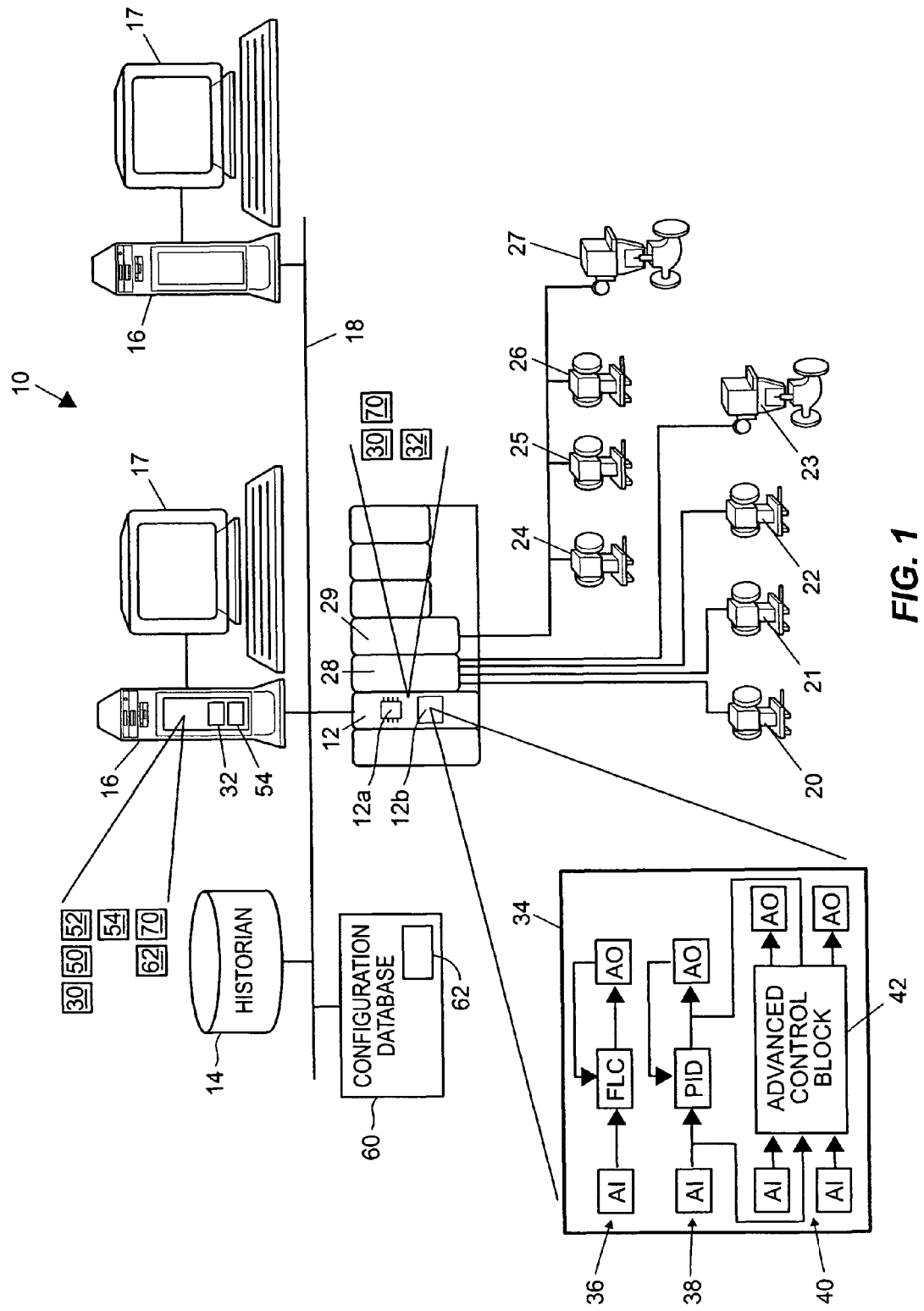
FIG. 1 is a block diagram of an example process control system.

Referring now to FIG. 1, a process control system 10 includes a process controller 12 connected to a data historian 14 and to one or more host workstations or computers 16 (which may be any type of personal computers, workstations, etc. each having a display screen 17), via a communications network 18. The controller 12 is also connected to field devices 20-27 via input/output (I/O) cards 28 and 29. The communications network 18 may be, for example, an Ethernet communications network or any other suitable or desirable communications network while the data historian 14 may be any desired type of data collection unit having any desired type of memory and any desired or known software, hardware or firmware for storing data. The controller 12, which may be, by way of example, the DeltaV™ controller sold by Fisher-Rosemount Systems, Inc., is communicatively connected to the field devices 20-27 using any desired hardware and software associated with, for example, standard 4-20 ma devices and/or any smart communication protocol such as the Fieldbus protocol, the HART protocol, etc.

The field devices 20-27 may be any types of devices, such as sensors, valves, transmitters, positioners, etc. while the I/O cards 28 and 29 may be any types of I/O devices conforming to any desired communication or controller protocol. In the embodiment illustrated in FIG. 1, the field devices 20-23 are standard 4-20 ma devices that communicate over analog lines to the I/O card 28 or are HART devices that communicate over combined analog and digital lines to the I/O card 28 while the field devices 24-27 are smart devices, such as Fieldbus field devices, that communicate over a digital bus to the I/O card 29 using Fieldbus protocol communications. Generally speaking, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. Of course, the field devices 20-27 could conform to any other desired standards or protocols, including any standards or protocols developed in the future.

The controller 12 includes a processor 12a that implements or executes one or more process control routines, which may include control loops, stored in a computer readable memory 12b therein or otherwise associated therewith and communicates with the devices 20-27, the host computers 16 and the data historian 14 to control a process in any desired manner. It should be noted that any control routines or elements described herein may have parts thereof implemented or executed by processors in different controllers or other devices, such as one or more of the field devices 24-27 if so desired. Likewise, the control routines or elements described herein to be implemented within the process control system 10 may take any form, including software, firmware, hardware, etc. A process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, it will be understood that the controller 12 may be configured to implement a control strategy or control routine in any desired manner.

In one embodiment, the controller 12 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 12, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

One or more of the controllers 12 may stores and execute a controller application 30 that implements a control strategy using a number of different, independently executed, control modules 32. The control modules 32 may each comprise function blocks operating in conjunction with other function blocks (via communications called links) to implement process control loops within the process control system 10. However, control modules 32 may be designed using any desired control programming scheme including, for example, sequential function block, ladder logic, etc.

As illustrated by the exploded block 34 of FIG. 1, the controller 12 may include a number of single-loop control routines, illustrated as routines 36 and 38, and, if desired, may implement one or more advanced control loops, illustrated as a control loop 40. Each such loop may be a control module. The single-loop control routines 36 and 38 are illustrated as performing signal loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 40 is illustrated as including an advanced control system 42 having inputs communicatively connected to numerous AI function blocks and outputs communicatively connected to numerous AO function blocks, although the inputs and outputs of the advanced control system 42 may be connected to any other desired function blocks or control elements to receive other types of inputs and to provide other types of control outputs. The advanced control system 42, which is adapted to control processes exhibiting non-linear input/output characteristics as described in more detail herein, generally includes any type of multiple-input/multiple-output control routine (typically used to control two or more process outputs by providing control signals to two or more process inputs) and one or more non-linear or advanced process models which are developed to accurately model the non-linear characteristics of the process. Thus, while the advanced control system 42 will be described herein as using a model predictive control (MPC) block, the advanced control system 42 could, in different implementations, incorporate or use any other multiple-input/multiple-output block, such as a neural network control block, a multi-variable fuzzy logic control block, a real-time optimizer block, etc.

It will be understood that the function blocks illustrated in FIG. 1, including the advanced control system 42 which can be implemented as one or more interconnected function blocks, can be executed by the controller 12. Function blocks could be implemented by the controller application 30, for example. Additionally or alternatively, function blocks can be located in and executed by any other processing device, such as one of the workstations 16 or even one of the field devices 24-27.

One or more of the workstation 16 may store and execute a configuration application 50 that is used to create or change the process control modules 30 and to download these control modules via the network 18 to one of the controllers 12 and/or to field devices such as one of the field devices 24-27. The workstation 16 may also store and execute a viewing application 52 that receives data from the controller 12 via the network 18 and that displays this information via a display mechanism using predefined user interfaces 54 or views, typically created using the configuration application 50. In some cases, the viewing application 52 receives inputs, such as set point changes, from the user and provides these inputs to the controller application 30 within one or more of the workstations 16 and/or controllers 12.

The configuration of the process plant 10 may be stored in a configuration database 60 coupled to the network 18. The configuration database 60 may execute a configuration database application 62 that stores the current configuration of the process control system and data associated therewith. Additionally or alternatively, the configuration database application 62 may be executed on one or more of the workstations 16.

One or more of the workstations 16 may also store and execute other applications, such as training, testing and/or simulation applications 70. Such applications typically interact with and receive data from the controllers 12 and the configuration database 60 related to the operation or set up of the process control system. One or more of the process control modules 32 within the workstation 16, the controller 12, and/or the field devices 24-27 may be set in a simulation mode or state to provide predetermined or operator provided values back to the simulation software 70 to enable testing of the control modules 32 used by the controller applications 30 and the user interfaces 54 used by the viewing application 52. In some cases, a simulation application 70 may additionally or alternatively be implemented in the controller 12.

The configuration application 50 may be used to create, download and/or implement the advanced control system 42. Techniques for creating, downloading and implementing an advanced control system are described in U.S. Pat. No. 6,445, 963; which is assigned to the assignee hereof and which is hereby expressly incorporated by reference herein. But, unlike the system described in U.S. Pat. No. 6,445,963, the configuration application 50 may permit a user to configure the advanced control system 42 to operate in conjunction with a model of a batch process as will be described in more detail subsequently. While the configuration application 50 may be stored in a memory within the workstation 16 and executed by a processor therein, this routine (or any part thereof) may additionally or alternatively be stored in and executed by any other device within the process control system 10, if so desired. It will be understood by one of ordinary skill in the art that the techniques described in U.S. Pat. No. 6,445,963 need not be used, and other suitable techniques may be used as well.

Figure 2:
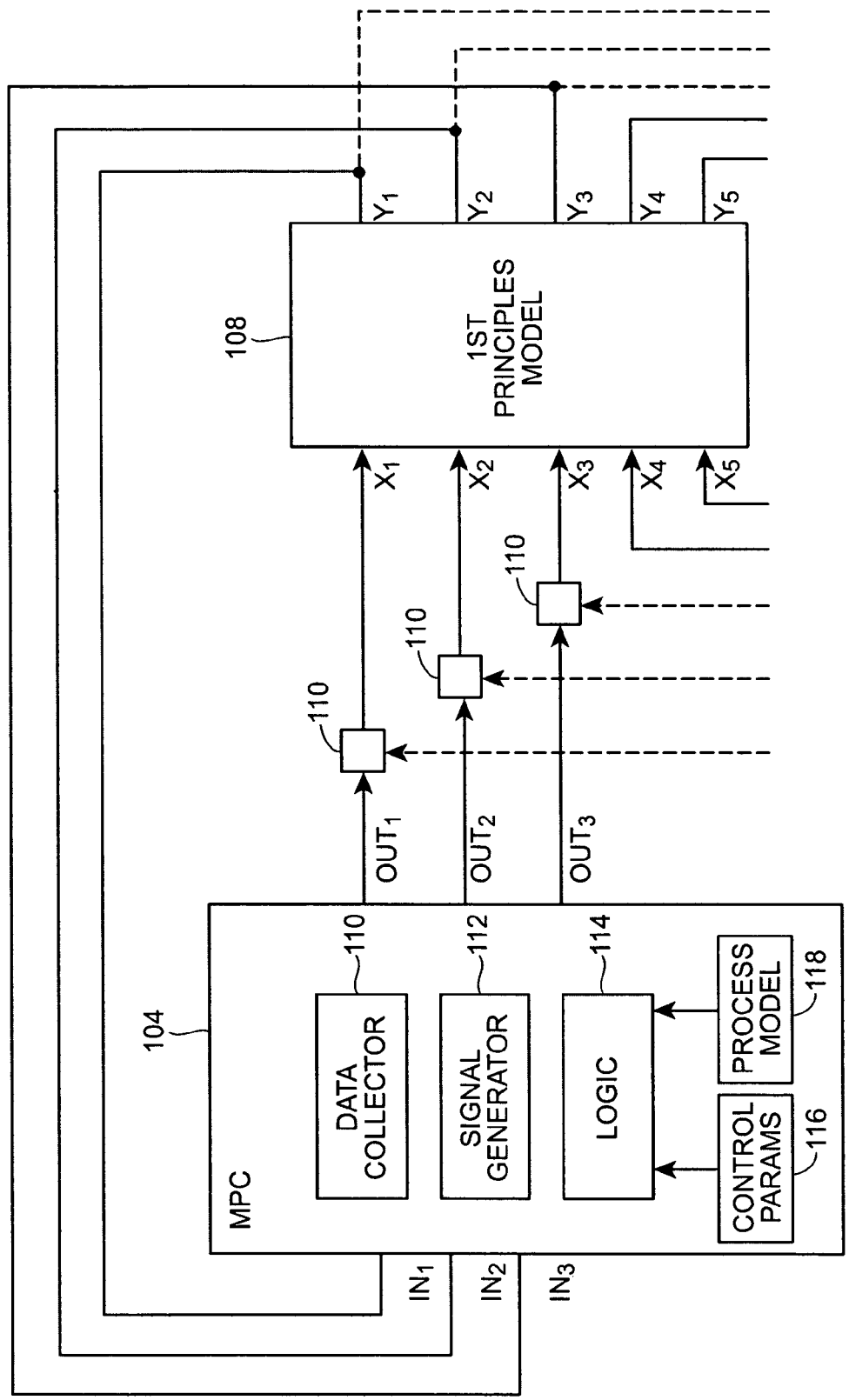
FIG. 2 is a block diagram of a model predictive control block coupled to a first principles model of a batch process.

As described above, the advanced control system 42 may comprise an MPC block. FIG. 2 is a block diagram of an MPC block 104 communicatively coupled to a first principles model 108 of a batch process. As will be described subsequently, the first principles model 108 may be used to configure the MPC block 104 prior to using the MPC block 104 for controlling a batch process. Additionally or alternatively, the first principles model 108 may be used in conjunction with the MPC block 104 for controlling the batch process. The MPC block 104 and the first principles model 108 of FIG. 2 may be implemented by the simulation application 70 and/or the controller application 30, for example.

The MPC block 104 is a 3×3 control block having three inputs $IN_1$-$IN_3$ and three outputs $OUT_1$-$OUT_3$ while the first principals model 108 corresponds to a portion of a batch process having inputs $X_1$-$X_5$ and outputs $Y_1$-$Y_6$. Of course, the MPC block 104 and the first principles model 108 could include any other numbers of inputs and outputs. While the MPC block 104 may generally be a square block, i.e., having the same number of inputs as outputs, this configuration is not necessary and the MPC block 104 may have different numbers of inputs and outputs. As illustrated in FIG. 2, the model outputs $Y_1$-$Y_3$ are communicatively coupled to the MPC block inputs $IN_1$-$IN_3$, respectively, and the MPC block outputs $OUT_1$-$OUT_3$ are communicatively coupled to the model inputs $X_1$-$X_3$, respectively. Of course, any of the inputs and outputs of the first principles model 104 may be connected to other control loops or to other elements within other control routines, models, and/or simulations associated with the process control system 10 (as indicated by dotted lines connected to the process inputs and outputs in FIG. 2). Optionally, the MPC block 104 and the other blocks which may be providing control inputs to the model 108 (as illustrated by dotted lines connected to the process inputs $X_1$-$X_3$) may be connected through a switch of some sort, these switches being illustrated by the boxes 110 in FIG. 2. The switches 110 may be hardware or software switches and, if desired may be provided by having the different control input signals delivered to different inputs of a function block, such as a Fieldbus function block, which can then select between the control signal from the MPC block 104 and a control signal from a different function block, such as from a PID function block, based on the mode of the function block receiving the two signals.

As will be understood by those of ordinary skill in the art, the model inputs $X_1$-$X_3$ to which the outputs of the MPC control block 104 are connected in FIG. 2 may correspond to any desired batch process inputs including, for example, inputs to control loops defined within an existing control strategy, inputs to valves or other devices associated with the batch process, etc. Likewise, one or more of the model outputs $Y_1$-$Y_3$ connected to the inputs of the MPC block 104 may correspond to any desired batch process outputs including, for example, outputs of valves or other sensors, outputs of AO or AI function blocks, or outputs of other control elements or routines, etc. Additionally, zero, one, or more of the model outputs $Y_1$-$Y_3$ may correspond to unmeasurable real-time parameters associated with the batch process. Unmeasurable real-time parameters refers to batch process parameters of which measurements cannot be obtained practically within a time frame that would allow using the measurements to control the current batch process. Measurements of batch process parameters that may take several minutes or hours to determine are not "real-time" measurements. For example, laboratory tests that may take several minutes or hours to determine a result are not real-time measurements. Additionally, measurements of batch process parameters from previous batches used to control a current batch are not real-time measurements. Further, unmeasurable real-time parameters do not include batch process parameters that were being measured in real-time at some point, but now are being estimated because of a faulty or failed sensor, for example. Examples of unmeasurable real-time parameters include a concentration of a component, a rate of change of the concentration of the component, an amount of the component, a rate of change of the amount of the component, etc. Typically, measurement of such parameters during a batch process involves taking samples and performing laboratory analyses on the samples. The laboratory analyses may take several minutes or hours.

The first principles model 108 may generate model outputs corresponding to an unmeasurable real-time parameter using one or more equations based on the laws of physics. For example, a chemical reaction in a batch process can be modeled by one or more equations that adhere to principles such as conservation of mass, conservation of energy, etc.

The example MPC block 104 includes a data collection unit 110, a signal generator 112, generic control logic 114 and storage for storing control parameters 116 and a control prediction process model 118. The generic logic 114 may comprise, for example, a generic MPC routine that needs coefficients or other control parameters to be able to operate to perform control in a particular instance. In some cases, the generic logic 114 may also need a process model corresponding to the process that is to be controlled by the MPC block 104. In a training period, the MPC block 104 may collect data for use in creating a control prediction process model 118. For example, when instructed to do so by the operator (or at any other desired time), the signal generator 112 of the MPC block 104 may produce a series of waveforms at the outputs $OUT_1$-$OUT_3$ thereof so as to provide excitation waveforms to each of the model inputs $X_1$-$X_3$. If desired, these waveforms may be provided to the signal generator 112 by hardware and/or software outside of the MPC block 104 (e.g., from the workstation 16, the controller 12, or some other device). Additionally or alternatively, the waveforms may also be created by the signal generator 112. These waveforms may be designed to cause the first principles model 108 to operate over the different ranges of inputs expected during normal operation of the batch process. To develop a control prediction process model 118 for an MPC control routine, the signal generator 112 may deliver to each of the model inputs $X_1$-$X_3$, a series of different sets of pulses, wherein the pulses within each of the sets of pulses have the same amplitude but have pseudo-random lengths and wherein the pulses within the different sets of pulses have different amplitudes. Such a series of set of pulses may be created for and then delivered to each of the different model inputs $X_1$-$X_3$ sequentially, one at a time. During this time, the data collection unit 110 within the MPC block 104 collects or otherwise coordinates the collection data indicating the response of the model outputs $Y_1$-$Y_3$ to each of the waveforms generated by the signal generator 112 and may collect or coordinate the collection of data pertaining to the excitation waveform being generated. This data may be stored in the MPC block 104. Additionally or alternatively, this data may be sent automatically to the data historian 14 for storage and/or to the workstation 16 where this data may be displayed on the display 17.

Of course, the excitation waveforms generated by the signal generator 112 may be any desired waveforms developed to create a process model useful for the creation control logic parameters for any advanced control routine. In this example, the signal generator 112 generates any set of waveforms that is known to be useful in developing a control prediction process model for a model predictive controller, and these waveforms may take any form now known or developed in the future for this purpose. Because waveforms used to excite a process for the purpose of collecting data to develop a control prediction process model for model predictive control are well known to those of ordinary skill in the art, these waveforms will not be described further herein. Likewise, any other or any desired types of waveforms may be generated by the signal generator 112 for use in developing process models for advanced control (which includes modeling) units utilizing other control techniques such as neural networks, multivariable fuzzy logic, etc.

It should be noted that the signal generator 112 may take any desired form and may, for example, be implemented in hardware, software or a combination of both. If implemented in software, the signal generator 112 may store an algorithm that can be used to generate the desired waveforms, may store digital representations of the waveforms to be generated, or may use any other routine or stored data to create such waveforms. If implemented in hardware, the signal generator 112 may take the form of, for example, an oscillator or a square wave generator. If desired, the operator may be asked to input certain parameters needed to design the waveforms, such as the approximate response time of the process corresponding to the first principles model 108, the step size of the amplitude of the waveforms to be delivered to the process inputs, etc. The operator may be prompted for this information when the MPC block 104 is first created or when the operator instructs the MPC block 104 to begin to upset or excite the first principles model 108 and collect process data. In one embodiment, the data collection unit 110 collects (or otherwise assures the collection of) data in response to each of the excitation waveforms for three or five times the response time input by the operator to assure that a complete and accurate process model may be developed. However, data may be collected for any other amount of time. The data collection unit 110 may collect the data directly from the first principles model 108 or from a data historian, for example.

In any event, the MPC control block 104 may operate until the signal generator 112 has completed delivering all of the necessary excitation waveforms to each of the model inputs $X_1$-$X_3$ and the data collection unit 110 has collected data for the model outputs $Y_1$-$Y_3$. Of course, the operation of the MPC block 104 may be interrupted if so desired or if necessary during this data collection process.

The control prediction process model 118 may comprise a variety of models, including known models, and may comprise a mathematical algorithm, a series of response curves, etc. The control parameters 116 may comprise one or more of a matrix, MPC coefficients, etc. In implementations in which a control unit other than an MPC is utilized, control parameters may include, for example, tuning parameters, neural network parameters, scaling factors for multi-variable fuzzy logic, etc.

One of ordinary skill in the art will recognize that the MPC control block 104 is merely one example of an MPC that may be utilized. As just one additional example, an MPC, an external signal generator, and an external data collection unit could be utilized. One of ordinary skill in the art will recognize many different configurations could be used instead of the example MPC control block 104.

Referring again to FIG. 1, the MPC block 104 and the first principles model 108 may be implemented by various computing devices in the plant 10. For example, the MPC block 104 and the first principles model 108 may be implemented by one or more of the workstations 16. Additionally, at least portions of the MPC block 104 and/or at least portions of the first principles model 108 could be implemented by a controller 12 and/or field devices. One of ordinary skill in the art will recognize many other ways to implement portions of the MPC block 104 and the first principles model 108.

Figure 3:
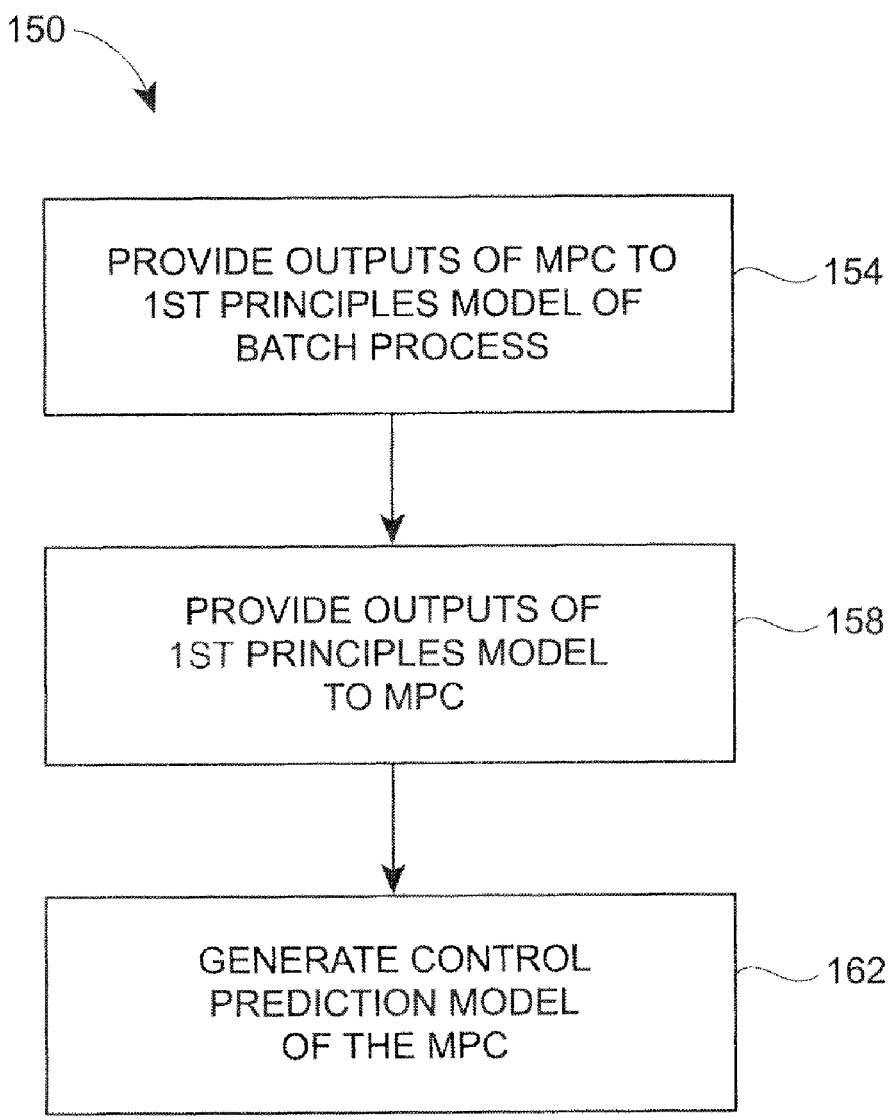
FIG. 3 is a flow diagram of an example method for operating model predictive control block coupled to a first principles model of a batch process.

FIG. 3 is a flow diagram of an example method 150 for operating an MPC in conjunction with a first principles model of batch process. The method 150 could be used to configure an MPC for use in controlling the batch process, for example. The method 150 could be implemented in connection with the MPC block 104 and the first principles model 108 of FIG. 2. One of ordinary skill in the art will recognize, however, that the method 150 could be implemented with various MPCs and first principles models.

At a block 154, outputs of an MPC are provided to a first principles model of a batch process. For example, as described above with respect to FIG. 2, the MPC could provide excitation signals to the first principles model during a configuration period. As an alternative, a signal generator separate from the MPC could supply the excitation signals during the configuration period. Additionally or alternatively, as will be described in more detail below, the MPC could provide control signals to the first principles model during operation of a batch process.

At a block 158, outputs of the first principles model are provided to the MPC. Outputs of the first principles model may include one or more outputs corresponding to batch process outputs including, for example, outputs of valves or other sensors, outputs of AO or AI function blocks, outputs of other control elements or routines, etc. Additionally, outputs of the first principles model may include one or more outputs corresponding to unmeasurable real-time parameters associated with the batch process. Outputs of the first principles model may be provided directly to the MPC or indirectly. For example, the MPC could be provided with data retrieved from a data historian.

At a block 162, a control prediction process model of the MPC may be generated based on at least some of the outputs of the first principles model. The control prediction process model of the MPC also may be generated based on additional information such as simulated outputs of function blocks, control routines, etc. Further, such additional information may include information obtained from an actual batch process. Any of a variety of techniques, including known techniques, may be used to generate the control prediction process model of the MPC. Such techniques may optionally include performing a screening procedure to eliminate data outliers, obviously erroneous data, etc.

At a block 166, control parameters of the MPC may be generated based on at least some of the outputs of the first principles model. For example, control parameters could be generated by inverting the control prediction process model, which was generated based on the outputs of the first principles model at the block 162. Any of a variety of techniques, including known techniques, may be used to generate the control parameters.

Once the control parameters have been generated, the MPC may be used in controlling the batch process and/or in simulating control of the batch process. Referring again to FIG. 2, the configured MPC block 104 and the first principles model 108, in conjunction with a simulation application, may be used to simulate operation of the batch process. As is known to those of ordinary skill in the art, simulation of batch processes can be performed at speeds much faster than the time an actual batch process may take to complete. Thus, multiple control strategies may be simulated in a relatively short period of time. For example, an engineer could perform "what-if" scenarios to determine a good strategy or to improve upon an existing strategy. Determining control strategies for simulation could comprise an ad hoc procedure or some systematic procedure. For example, the faster than real time simulations may be used to generate profiles of process inputs and outputs for the current and future batches for "what if scenarios" that can be analyzed by other techniques, such as multivariate statistical process control (MSPC), to diagnose and prevent abnormal batches.

Figure 4:
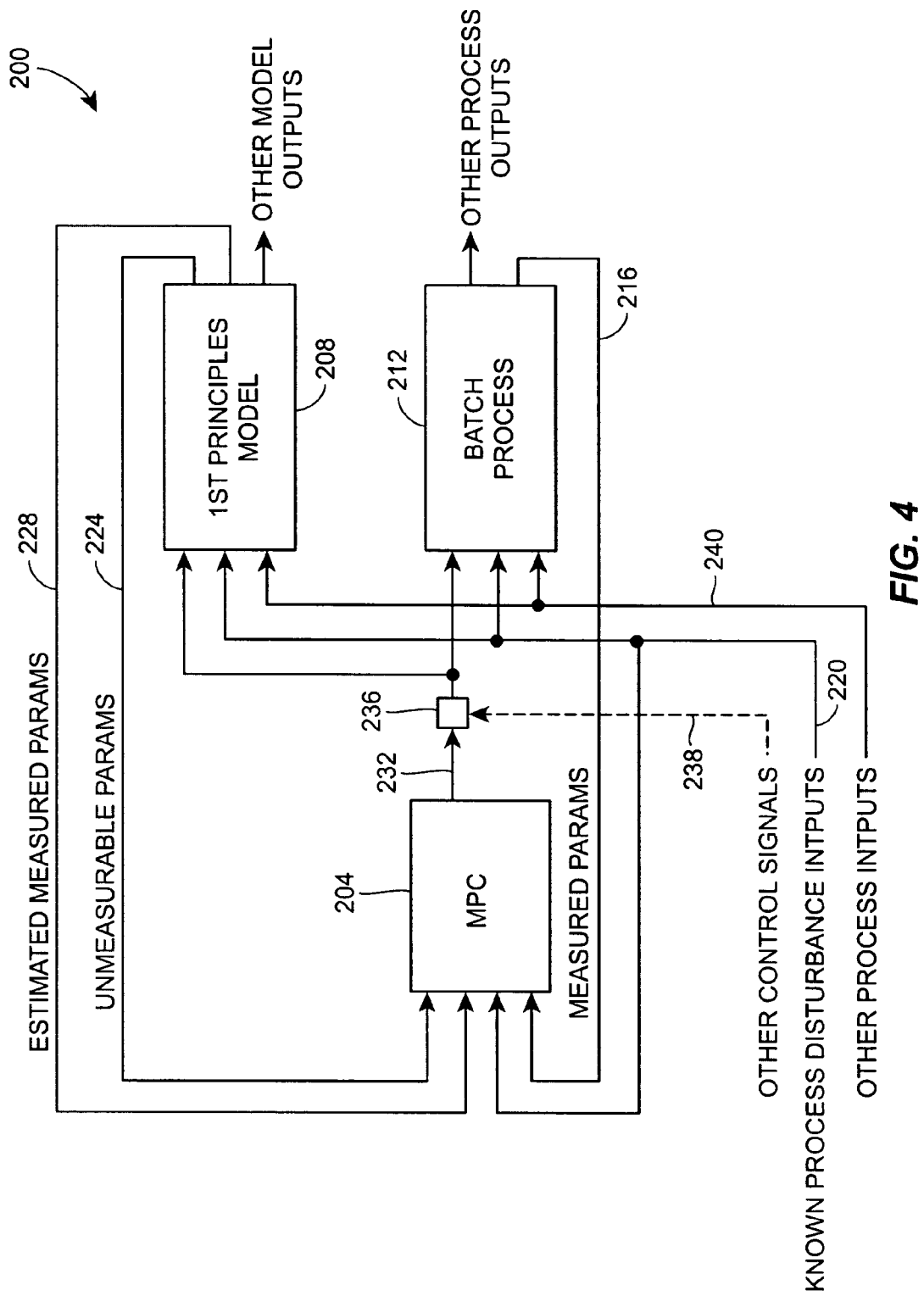
FIG. 4 is a block diagram of an example system for controlling a batch process.

A multiple-input/multiple-output control system coupled to a first principles model may also be used during operation of the batch process to help control the batch process. FIG. 4 is a block diagram of an example system for controlling a batch process, wherein the system 200 includes a multiple-input/multiple-output control block which, in this case, is illustrated as an MPC block 204 communicatively coupled to a first principles model 208. Additionally, the MPC block 204 is communicatively coupled to a batch process 212. In FIG. 4, a set of signals are represented by a single line for clarity. It is to be understood, therefore, that a single line may represent one or more signals. The MPC block 204 may comprise the MPC block 104 of FIG. 2 or any suitable MPC block, and the first principles model 208 may be a first principles model such as described with respect to FIG. 2.

At least some batch process outputs, labeled as batch process outputs 216 (which may be control and constraint measurements or parameters, for example) of the batch process 212 may be fed back to inputs of the MPC block 204 as is typical in MPC control. Likewise, a set of measured or known process disturbance inputs 220 may be provided to both the batch process 204 and to the input of the MPC block 204, as is also typical in known MPC techniques.

Further, a set of outputs of the first principles model 208 may be fed to inputs of the MPC block 204, and these outputs of the first principles model 208 are labeled 224 in FIG. 4. The outputs 224 of the first principles model 208 may correspond to unmeasurable real-time parameters of the batch process 212. In other words, the MPC block 204 may be provided with estimates of unmeasurable real-time parameters of the batch process 212. Optionally, a set of estimated parameters 228 generated by the first principles model 208 and corresponding to the measured parameters 216 may be fed to inputs of the MPC block 204.

The MPC control block 204 may include standard MPC logic having a linear process model (i.e., a control prediction process model) therein and may generally operate in a typical or known manner to develop a set of process control signals or manipulated variable control signals 232. The manipulated variable control signals 232 may be provided to inputs of the batch process 212 and to inputs of the first principles model 208. Optionally, a switch 236 may be provided to allow switching between manipulated variable control signals 232 and other control signals 238. Optionally, other process input signals 240 may be provided to the batch process 212 and to the first principles model 208.

The first principles model 208 may generate unmeasurable real-time parameters, as discussed previously, as well as parameters that correspond to at least some of the outputs of the batch process 212. The first principles model 208 may generate these parameters based on at least some of the outputs 232 of the MPC block 204, known process disturbance inputs 220, and process inputs 240. As described above, at least some of the outputs of the first principles model 208 may be provided to the MPC block 204.

Generally, the MPC block 204 may utilize estimates of unmeasurable real-time parameters generated by the first principles model 208 to help control the batch process 212. Further, because estimates of unmeasurable real-time parameters are provided as inputs to the MPC block 204, the MPC block 204 may be used to help control one or more of the unmeasurable real-time parameters using known MPC techniques, for example. For instance, the MPC block 204 may attempt to control a rate of change parameter (e.g., a rate of change of concentration of a product, rate of change of concentration of a byproduct, rate of change of concentration of a charge, rate of change of concentration of a contaminant, etc.). It may be useful to keep a rate of change related to a batch process close to some desired profile. For example, keeping a rate of change of a product concentration constant at a desired level for some time period during a batch process may help to improve a product yield, improve product quality, predict a batch cycle time, decrease the batch cycle time, etc. Fast reaction rates can, in some instances, cause reactions to runaway or produce undesirable byproducts. Slow rates may cause longer batch times and lower yields than might otherwise be attained. Controlled rates may enable more accurate predictions of batch performance and a faster and more accurate correction of batch profiles by reducing the effect of time shifts caused by holds and abnormal operation.

Generally, the system 200 may help to improve end points of the batch process in connection with improving capacity and/or quality. A system such as the system 200 may help address variable ramping response and non-stationary behavior of batch processes, whereas prior art model identification and MPC systems assume a steady state or constant ramp rate typical of continuous processes.

Referring again to FIG. 1, portions of the system 200 may be implemented by various computing devices. For example, the first principles model 208 may be implemented by one or more of the workstations 16, for example. In one embodiment, the controller application 30 and/or the simulation application 70, executing on one or more workstations 16, may implement the first principles model 208. Additionally, one or more controllers 12 and/or one or more field devices 24-27 may implement the MPC block 204 and other control routines associated with the batch process 212. In one embodiment, the MPC block 204 may be implemented by the controller application 30 implemented by a controller 12 and/or one or more field devices 24-27. One of ordinary skill in the art will recognize many other ways to implement portions of the system 200. As just one example, at least portions of the first principles model 208 could be implemented by a controller 12 and/or field devices, and at least portions of the MPC block 204 could be implemented by one or more workstations 16.

Figure 5:
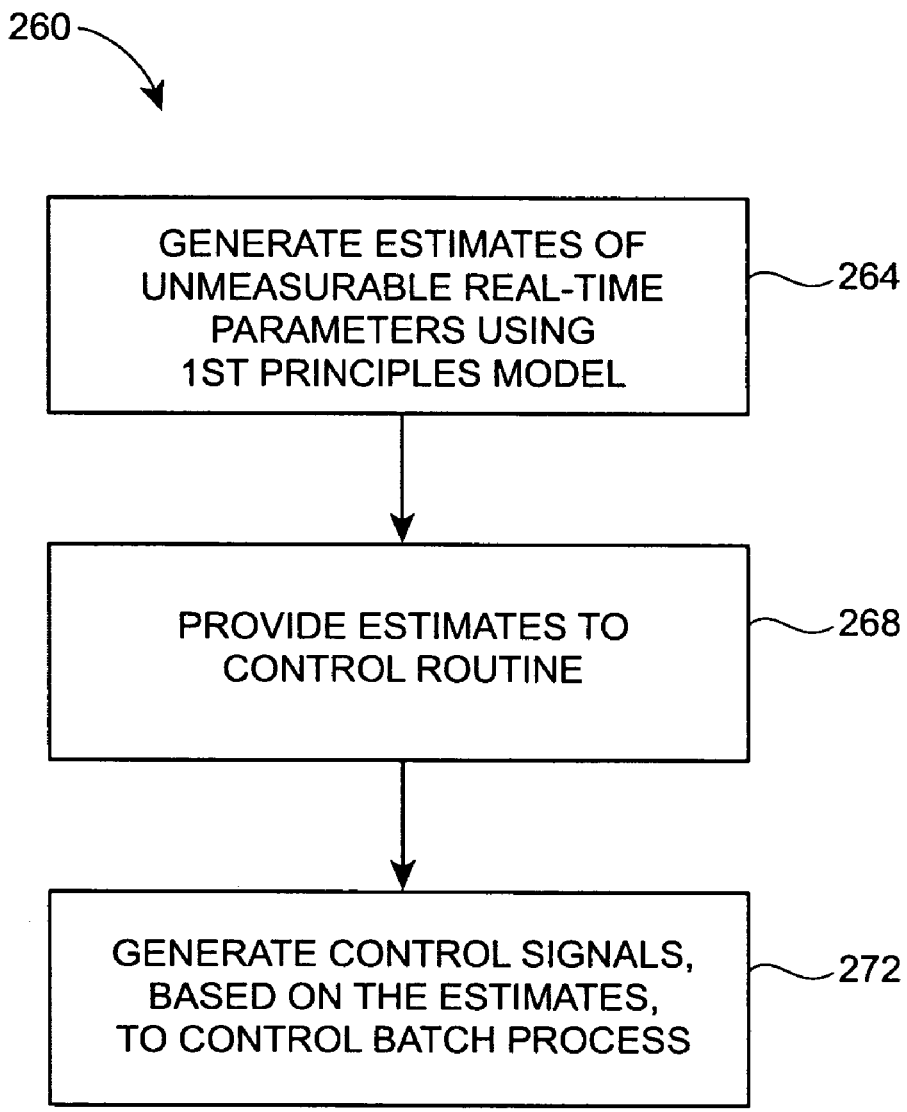
FIG. 5 is a flow diagram of an example method for controlling a batch process.

FIG. 5 is a flow diagram of an example method 260 for controlling a batch process. The method 260 could be implemented using the system 200 of FIG. 4, for example, and for ease of explanation, the method 260 will be described with reference to FIG. 4. One of ordinary skill in the art will recognize, however, that the method 260 could be implemented using other systems as well.

At a block 264, a first principles model of a batch process may be used to generate estimates of unmeasurable real-time parameters associated with the batch process. For example, the first principles model 208 may generate estimates of unmeasurable real-time parameters such as estimates of a rate of change associated with the batch process. At a block 268, estimates generated at the block 264 may be provided to a control routine. The control routine may include a multiple input/multiple output control routine such as the MPC block 204. Optionally, other types of control routines may be utilized such as fuzzy logic routines, neural networks, etc.

At a block 272, control signals are generated based on estimates generated at the block 264, the control signals generated by the control routine to help control the batch process. Of course, the control signals may be generated based on other information as well such as measurements from the actual batch process and, optionally, other outputs generated by the first principles model. The control signals may be used to control the batch process in a variety of ways. For example, the control signals may attempt to control a rate of change associated with the batch process, an endpoint of the batch process, a product quantity at the end of the batch, a product yield, etc. As another example, the control signals may attempt to keep a rate of change to a desired profile. The desired profile may be a constant rate of change for some time period during the batch process. One of ordinary skill in the art may recognize that the desired profile may vary depending on the particular batch process being controlled. Thus, a desired rate of change profile may include at least some time periods in which the rate of change is not constant.

The control routine that utilizes the estimates generated at the block 264 may be configured using a first principles model and, optionally, data regarding actual batch processes. In general, the control routine may utilize a variety of control techniques, including known techniques, to control a variety of aspects of the batch process by utilizing unmeasurable real-time parameter data generated by the first principles model.

Figure 6:
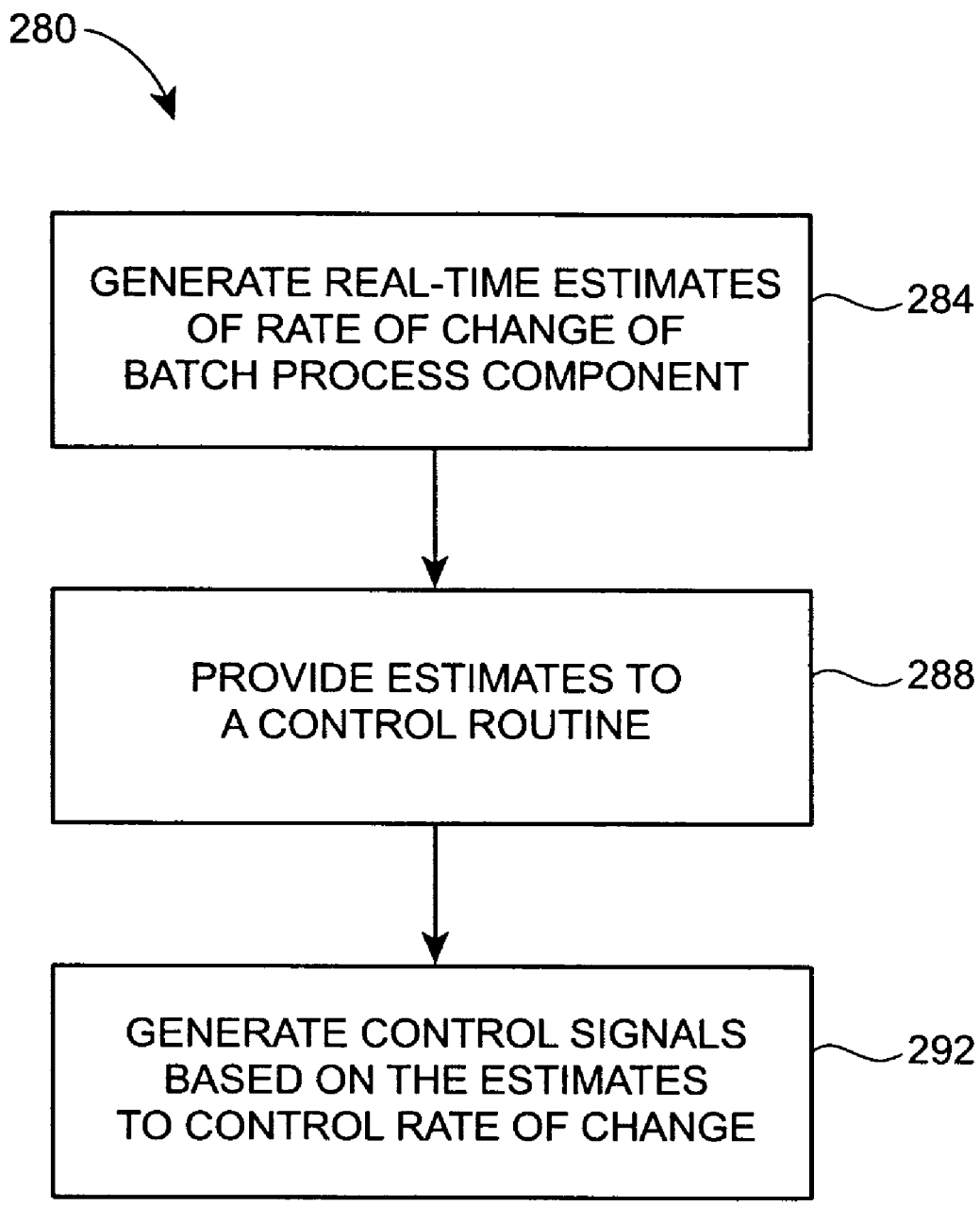
FIG. 6 is a flow diagram of another example method for controlling a batch process.

FIG. 6 is a flow diagram of another example method 280 for controlling a batch process. The method 280 could be implemented using the system 200 of FIG. 4, for example, and for ease of explanation, the method 280 will be described with reference to FIG. 4. One of ordinary skill in the art will recognize, however, that the method 280 could be implemented using other systems as well.

At a block 284, real-time estimates of a rate of change of a batch process component may be generated. For example, the first principles model 208 may generate the estimates. Optionally, other modeling/estimating systems could be used to generate the estimates as well, such as fuzzy logic systems, neural networks, etc. At a block 288, estimates generated at the block 284 may be provided to a control routine. The control routine may include a multiple input/multiple output control routine such as the MPC block 204. Optionally, other types of control routines may be utilized such as fuzzy logic routines, neural networks, etc.

At a block 292, control signals are generated based on estimates generated at the block 284, the control signals generated by the control routine to help control the rate of change. Of course, the control signals may be generated based on other information as well such as measurements from the actual batch process and, optionally, other estimates such as estimates of unmeasurable real-time parameters. The control signals may be used to keep the rate of change close to a desired profile, for example. The desired profile may be a constant rate of change for some time period during the batch process. One of ordinary skill in the art may recognize that the desired profile may vary depending on the particular batch process being controlled. Thus, a desired rate of change profile may include at least some time periods in which the rate of change is not constant. For example, it may be desirable for the rate of change to constantly or exponentially increase or decrease during some time period of the batch process.

Figure 7:
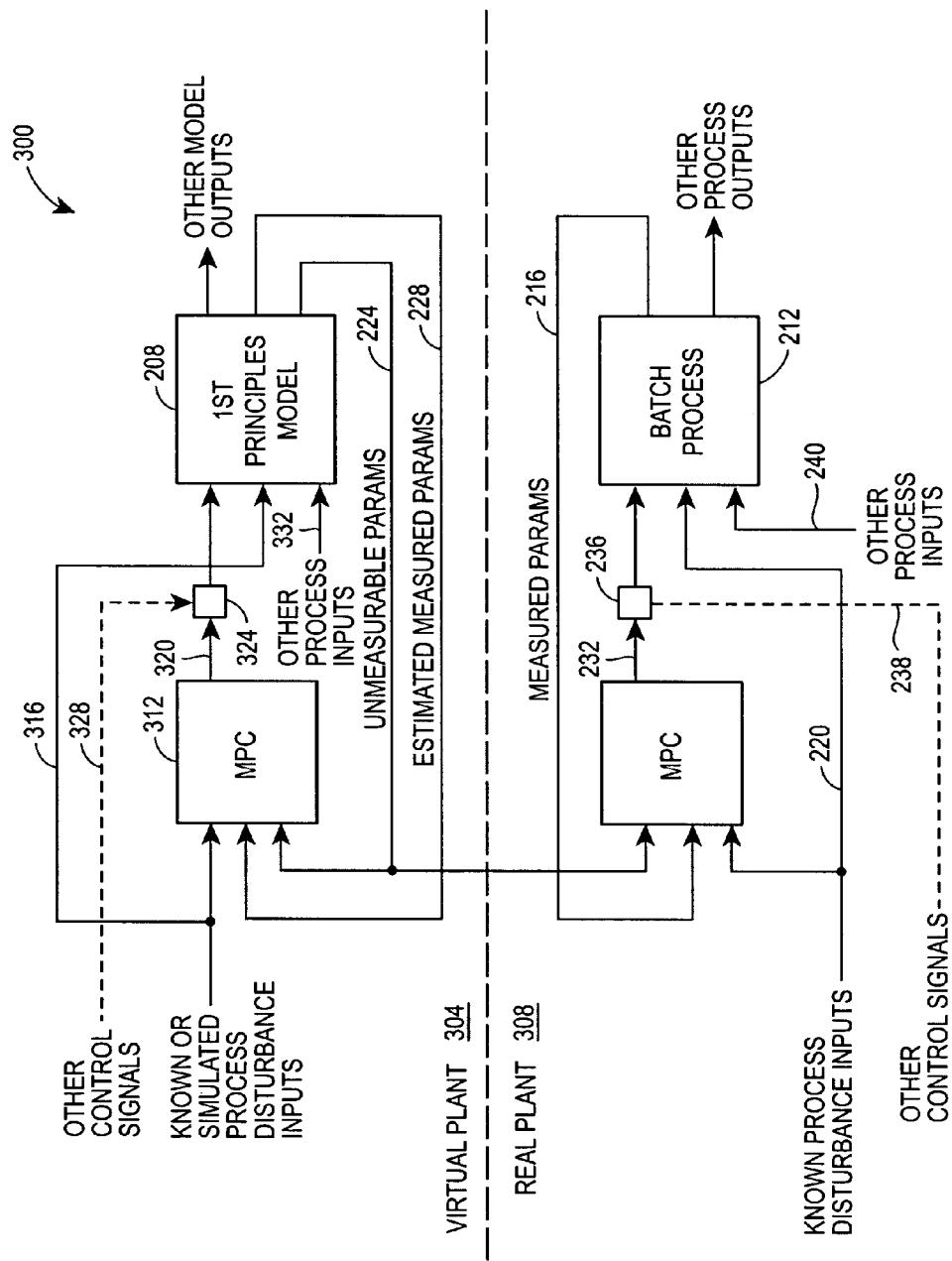
FIG. 7 is a block diagram of another example system for controlling a batch process.

FIG. 7 is a block diagram of another example system for controlling a batch process. The system 300 includes many like-numbered elements from the example system 200 of FIG. 4. Additionally, the methods 260 and 280 of FIGS. 5 and 6 optionally may be implemented by a system such as the system 300. The system 300 generally includes a virtual plant 304 and a real plant 308. The real-plant 308 corresponds to control of actual physical devices used in implementing the batch process, whereas the virtual plant 304 corresponds to a simulation of the real plant 308. In FIG. 7, a set of signals are represented by a single line for clarity. It is to be understood, therefore, that a single line may represent one or more signals. As will be described below, data may be exchanged between the virtual plant 304 and the real plant 308 during operation of a batch process to help control the batch process.

The real plant 308 includes the MPC block 204 and the batch process 212 configured similarly to the system 200 of FIG. 4. The virtual plant 304 includes the first principles model 208 communicatively coupled to a virtual plant MPC block 312. The virtual plant MPC block 312 may be provided with the estimates of unmeasurable real-time parameters 228. Optionally, the set of estimated parameters 228 generated by the first principles model 208 may be fed to inputs of the virtual plant MPC block 312. Further, the virtual plant MPC block 312 may be provided with signals 316 corresponding to simulated values of the measured or known process disturbance inputs 220 or the measured or known process disturbance inputs 220 themselves.

The virtual plant MPC control block 312 may include standard MPC logic having a linear process model therein and may generally operate in a typical or known manner to develop a set of process control signals or manipulated variable control signals 320. The manipulated variable control signals 320 may be provided to inputs of the first principles model 208. Optionally, a switch 324 may be provided to allow switching between the manipulated variable control signals 320 and other signals 328, which may be simulated signals corresponding to the control signals 238 or the control signals 238 themselves. Optionally, other signals 332, which may be simulations of the process input signals 240 or the process input signals 240 themselves, may be provided to the first principles model 208.

The MPC block 204 and the virtual plant MPC block 312 may be at least similarly configured. As just one example, the MPC block 204 could be configured in a known manner to control the batch process 212 (e.g., a control prediction process model and control parameters could be generated). Then, the same control prediction process model and/or control parameters could be provided to the virtual plant MPC block 312. Of course, one of ordinary skill in the art will recognize many other techniques for similarly configuring the MPC block 204 and the virtual plant MPC block 312.

Generally, the virtual plant 304 may simulate operation of the real plant 308 during a batch process. For example, the first principles model 208 receives inputs that reflect the inputs to the batch process 212, and the first principles model 208 is generally configured to model operation of the batch process 212. Thus, the outputs 228 of the first principles model 208 should typically track the outputs 216 of the batch process 212. Additionally, the MPC block 204 and the virtual plant MPC block 312 should generate the same or similar manipulated variable control signals because they should have the same or a similar configuration and because they should each receive the same or a similar inputs.

Information may be communicated between the virtual plant 304 and the real plant 308 during operation of a batch process. For example, the unmeasurable real-time parameters 224 are provided to the MPC 204. As another example, the measured parameters 216 in the real plant 308 may be communicated to the virtual plant 304 so that the virtual plant 304 can optionally utilize the measured parameters 216. One of ordinary skill in the art will recognize many other types of information that may be communicated between the virtual plant 304 and the real plant 308.

In one embodiment, the virtual plant 304 optionally may utilize process modules that may be capable of utilizing mass transfer rates, residual puddles an bubbles, a modular pressure flow solver, etc. This may permit the virtual plant 304 to handle empty process volumes, zero flows, non-equilibrium conditions, etc. Additionally, in this embodiment, the virtual plant 304 optionally may utilize process modules with sectionalized volumes and circulation flows to permit simulation of mixing and transportation delays.

Referring again to FIG. 1, the virtual plant 304 and portions of the real plant 308 may be implemented by various computing devices. Portions of the virtual plant 304 may be implemented by one or more of the workstations 16, for example. In one embodiment, the controller application 30 and/or the simulation application 70, executing on one or more workstations 16, may implement at least part of the virtual plant 304. Additionally, one or more controllers 12 and/or one or more field devices 24-27 may implement portions of the real plant 308 such as the MPC block 204 and other control routines associated with the batch process. In one embodiment, the MPC block 204 may be implemented by the controller application 30 implemented by a controller 12 and/or one or more field devices 24-27. One of ordinary skill in the art will recognize many other ways to implement portions of the virtual plant 304 and the real plant 308. As just one example, portions of the virtual plant 304 could be implemented on a controller 12 and/or field devices, and portions of the real plant 308 could be implemented by one or more workstations 16.

Figure 8:
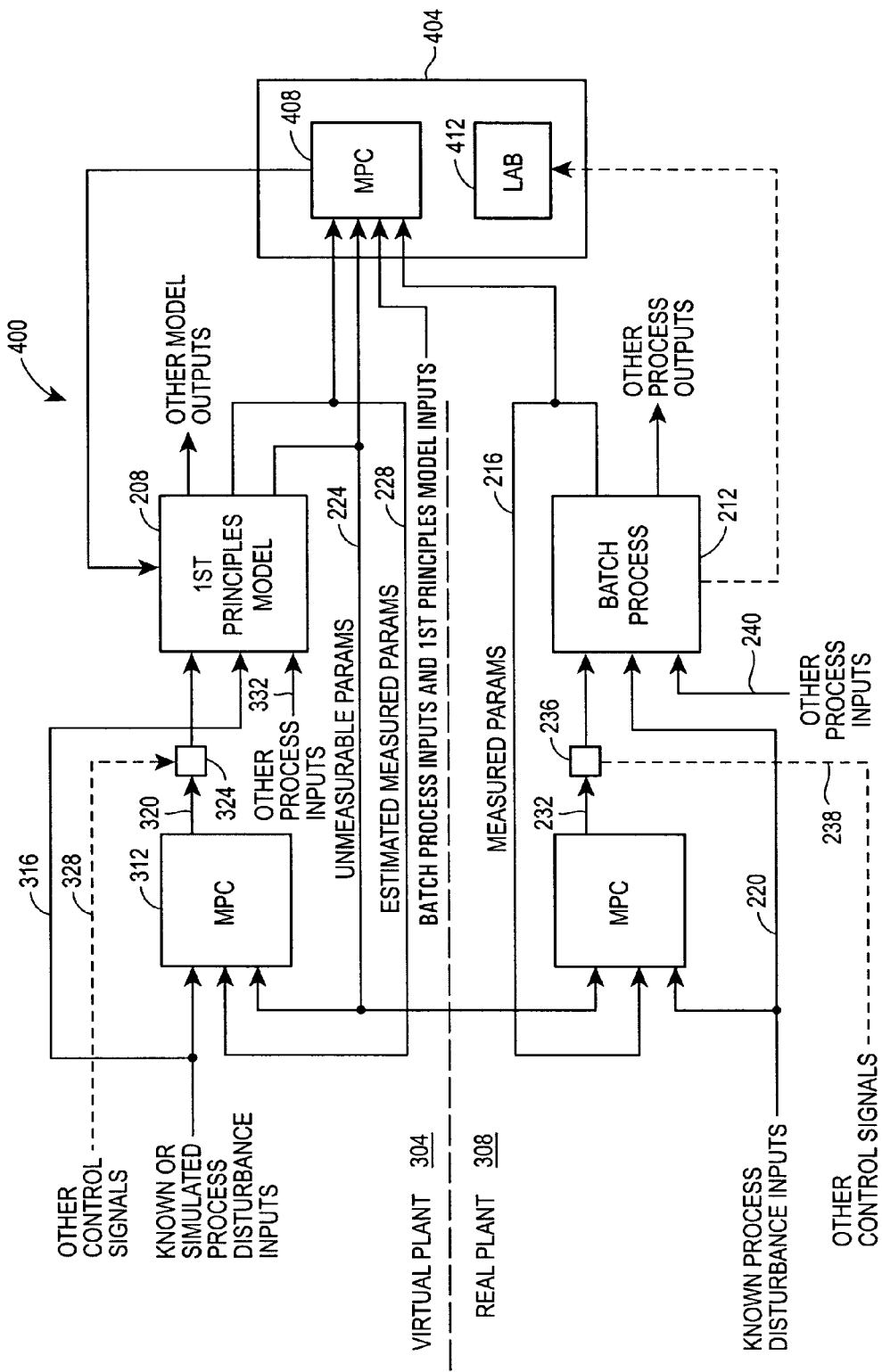
FIG. 8 is a block diagram of yet another example system for controlling a batch process.

FIG. 8 is a block diagram of yet another example system for controlling a batch process. The system 400 is similar to the system 300 of FIG. 7 and includes many like-numbered elements from the example system 300. Additionally, the methods 260 and 280 of FIGS. 5 and 6 optionally may be implemented by a system such as the system 280.

As is known, equipment conditions and other conditions related to the batch process may change over time. This may result in the first principles model 208 becoming less accurate over time. To help address this potential problem, the system 400 includes a model update system 404 for updating the first principles model 208 to reflect changes inthe batch process 212 over time.

Generally, the model update system 404 compares outputs of the batch process 212 with corresponding outputs of the first principles model 208 and adjusts the first principles model 208 based on that comparison. The model update system 404 includes a model update MPC block 408 communicatively coupled to the first principles model 208. Namely, parameters of the first principles model 208 are manipulated by the model update MPC block 408. In other words, the outputs of the MPC block 408, often referred to as manipulated variable control signals, are communicatively coupled to the first principles model 208 to update parameters in the first principles model 208 based on a comparison between outputs of the first principles model 208 and outputs of the batch process 212.

As is known, an MPC may include a control prediction process model that generally models responses of a process to perturbations in manipulated variable control signals generated by the MPC. The model update MPC block 408 may include a control prediction process model that generally models responses of the first principles model 208 to perturbations of parameters of the first principles model 208. The model update MPC block 408 may also include control parameters such as a matrix, MPC coefficients, etc., which are generally based on or determined using the control prediction process model of the MPC block 408.

The MPC block 408 may receive as inputs some or all of both inputs and outputs of the batch process 212 and corresponding inputs and outputs of the first principles model 208. The inputs and outputs of the batch process 212 could be obtained via a historian or from field devices, controllers, etc. within the plant. Optionally, the model update system 404 may include a system for obtaining measurements of parameters that could not, or are not, obtained in real time. Such a system is referred to herein as a laboratory 412. For example, samples taken during a batch could be processed by a laboratory to produce measurements of parameters of the batch that could not be measured in real time such as concentrations of components within a vessel, rates of change of components, etc. Although such measurements are not available in real-time for controlling the batch process, they may be used to adjust the first principles model 208 by comparing estimates generated by the first principles model 208 that correspond to those measurements. Thus, data corresponding to measurements generated by the laboratory 412—and corresponding to estimates of unmeasurable real-time parameters generated by the first principles model 208—may be provided to the MPC block 408. Additionally, estimates of unmeasurable real-time parameters generated by the first principles model 208 may be provided to the MPC block 408.

The MPC block 408 may utilize data provided to it adjust parameters of the first principles model 208. This provides one technique for adjusting the first principles model 208 when the batch process 212 has varied over time. Of course, the model update system 404 described above is merely one example of a system for adjusting a first principles model of a batch process. For example, other multiple input/multiple output systems, as an alternative to an MPC block, can be utilized such as fuzzy logic systems, neural networks, etc.

Referring again to FIG. 1, the model update system 404 may be implemented by various computing devices. Portions of the model update system 404 may be implemented by one or more of the workstations 16, for example. In one embodiment, the controller application 30 and/or the simulation application 70, executing on one or more workstations 16, may implement at least part of the model update system 404, such as the MPC block 408. Additionally, one or more controllers 12 and/or one or more field devices 24-27 may implement portions of the model update system 404 such as the MPC block 408. One of ordinary skill in the art will recognize many other ways to implement the model update system 404.

Figure 9:
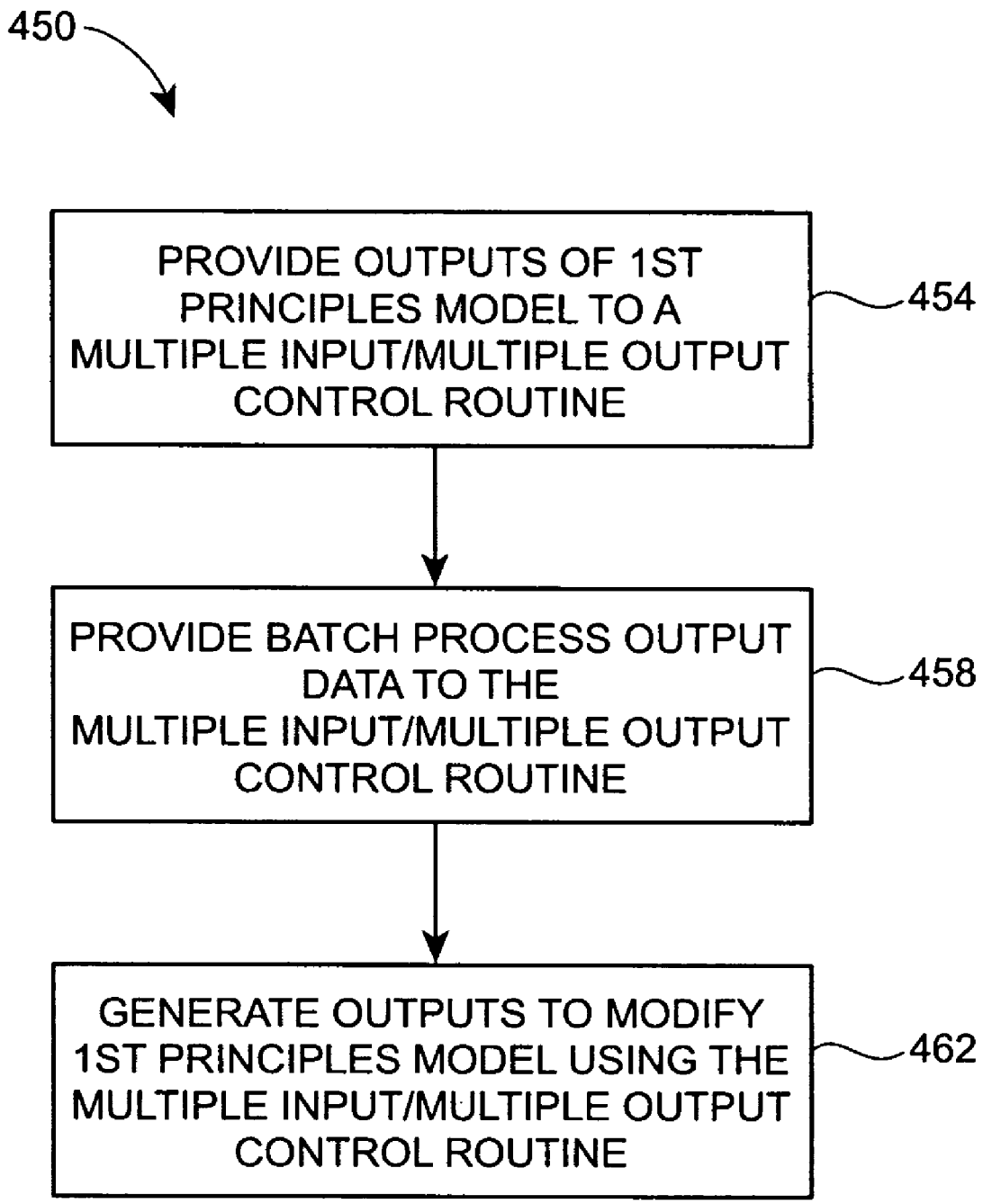
FIG. 9 is a flow diagram of an example method for updating a first principles model of a batch process.

FIG. 9 is a flow diagram of an example method 450 for updating a first principles model of a batch process. The method 450 could be implemented using the system 404 of FIG. 8, for example, and for ease of explanation, the method 450 will be described with reference to FIG. 8. One of ordinary skill in the art will recognize, however, that the method 450 could be implemented using other systems as well.

At a block 454, outputs of the first principles model may be provided to a multiple input/multiple output control routine. For example, in FIG. 8, outputs of the first principles model 208 are provided to the model update MPC block 408. The outputs of the first principles model may include estimates of measurable real-time parameters of the batch process. Additionally or alternatively, outputs of the first principles model may include estimates of unmeasurable real-time parameters of the batch process. The data provided at the block 454 may include data retrieved from a data historian, for example. Additionally or alternatively, the data provided at the block 454 may include data received from a workstation 16, a controller 12, a field device, etc.

At a block 458, output data associated with the batch process and corresponding to the outputs of the first principles model are provided to the multiple input/multiple output control routine. For example, in FIG. 8, data outputs of the batch process 212 are provided to the model update MPC block 408. Optionally, the provided output data may include data from the laboratory 408. Thus, the provided output data may additionally or alternatively include output data corresponding to estimates of unmeasurable real-time parameters generated by the first principles model.

At a block 462, the multiple input/multiple output control system may generate, based on the data received at the blocks 454 and 458, outputs to modify parameters of the first principles model. For example, an estimate generated by the first principles model may be considered a controlled variable, and a corresponding measured parameter from the real plant may be considered a set point. The multiple input/multiple output control system may then generate data to modify a parameter of the first principles model to attempt to cause the estimate to track the corresponding measured parameter. One example of a model parameter that may be adjusted is the Henry Coefficient. The Henry Coefficient is a parameter for determining the equilibrium concentration of dissolved oxygen that determines the mass transfer of oxygen between the gas and liquid phases. Other examples of model parameters that may be adjusted include activation energy, and coefficients for specific reaction, growth, mass transfer, and product and byproduct formation rates, oxygen limitation, substrate inhibition, cell maintenance, ion dissociation, yield, and cycle time.

One of ordinary skill in the art will recognize many variations are possible. For example, outputs of the first principles model and/or corresponding measured parameters that are provided to the multiple input/multiple output control system could be filtered to screen out short term transients. As another example, outputs of the first principles model that are provided to the multiple input/multiple output control system could be scaled to keep the process gains and the range of adjustment within reasonable ranges. As yet another example, adaptation could be automatically started and stopped during a batch cycle to allow adaptation in only appropriate portions of the batch cycle.

Figure 10:
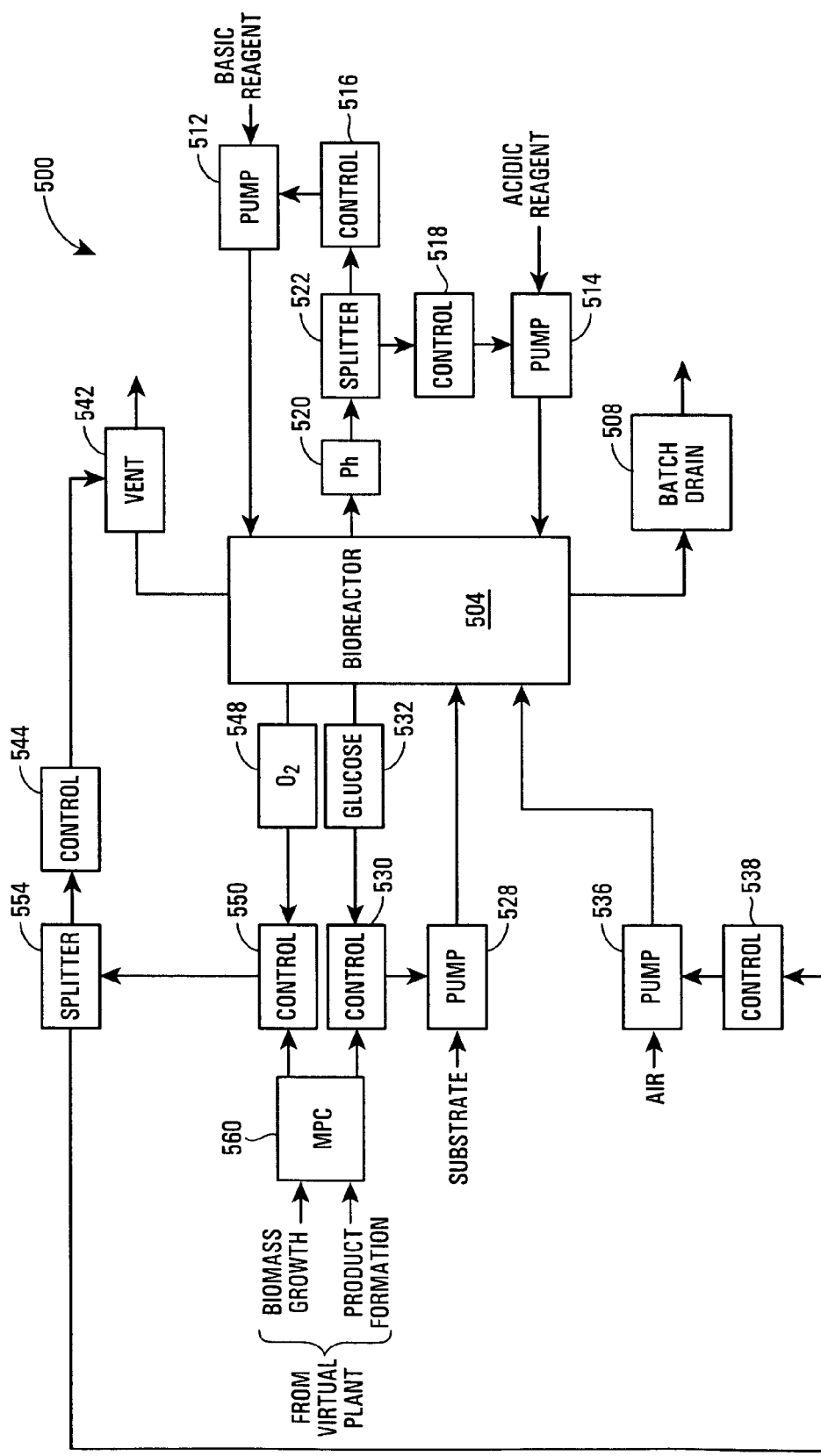
FIG. 10 is a block diagram of an example batch process system for producing penicillin.

FIG. 10 is a block diagram of an example batch process system 500 that utilizes techniques described herein. The batch process system 500 is configured to produce penicillin. Many components of the system 500 are not shown in FIG. 10 for ease of explanation. The system 500 includes a bioreactor 504 that receives substrate, basic reagent, acidic reagent, and air. Upon completion of a batch, the bioreactor 504 may be drained via batch drain 508. A pump 512 provides the basic reagent to the bioreactor 504, and a pump 514 provides the acidic reagent to the bioreactor 504. The pump 512 may be controlled by a control routine 516, and the pump 514 may be controlled by a control routine 518. A Ph sensor 520 may generate data regarding Ph in the bioreactor. The Ph data may be provided to a splitter 522, which in turn provides split Ph data to the control routines 516 and 518, which control the pumps 512 and 514 in order to control Ph in the bioreactor.

A pump 528 provides the substrate to the bioreactor 504, and the pump 528 may be controlled by a control routine 530. The substrate may include glucose. A glucose concentration sensor 532 may provide to the control routine 530 data regarding a concentration of glucose in the bioreactor 504. A pump 536 provides the air to the bioreactor 504, and the pump 536 may be controlled by a control routine 538. A vent 542 to the bioreactor 504 may be controlled by a control routine 544.

A dissolved oxygen sensor 520 may generate data regarding a concentration of dissolved oxygen in the bioreactor 504. The dissolved oxygen data may be provided to a control routine 550. The control routine 550, in turn, may provide control data to the control routine 538 and the control routine 544 via a splitter 554.

An MPC control block 560 receives estimates of a biomass growth rate and a product formation rate from a virtual plant, such as a virtual plant as described above having a first principles model of the batch process. The estimated biomass growth rate and the estimated product formation rate are real-time estimates of corresponding rates within the bioreactor 504. In particular, the estimated biomass growth rate may be an estimate of the growth rate of fungi cells within the bioreactor 504, and the estimated product formation rate may be an estimate of the concentration of penicillin within the bioreactor 504.

The MPC block 560 generates a first control signal output and provides it to the control routine 530, and generates a second control signal output and provides it to the control routine 550. The outputs generated by the MPC block 560 may be setpoints to be used by the control routine 530 and the control routine 550. For example, the first control signal provided to the control routine 530 may be a glucose concentration set point, and the second control signal provided to the control routine 550 may be a dissolved oxygen concentration set point. Thus, the MPC block 560 may adjust the glucose concentration set point the dissolved oxygen concentration set point during operation of the batch in response to the estimated biomass growth rate and the estimated product formation rate. In turn, the control routine 530 may generate control data to cause the pump 536 to add more or less air to the bioreactor 504, and generate control data to adjust the vent 542 to allow more or less gases within the bioreactor 504 to vent.

In a batch process to produce penicillin, fungi cells are provided with glucose and dissolved oxygen. Over time, the fungi cells excrete penicillin and also produce carbon dioxide. In one implementation, control utilizing the MPC block 260 was not utilized until a time after the start of the batch at which it was estimated that the production rate was roughly at its maximum. Then the MPC block 260 was utilized to attempt to keep the production rate constant.

It has been observed that a higher dissolved oxygen concentration progressively increased the biomass growth and product formation rates as the cell concentration increased. However, high air flow increased gas processing costs and high pressures increased the dissolved carbon dioxide, so the dissolved oxygen was kept lower in the beginning of the batch when it had minimal beneficial effect. A lower substrate concentration decreased the biomass growth but increased the product formation rates because of a reduced substrate inhibition factor. Consequently, the substrate concentration was initially high to grow cells, but was then lowered as the batch progressed to promote product formation. Tuning of the MPC block 560 could comprise using higher penalty on moves and a higher penalty on error for the production rate since it is much more important than the growth rate during the fed-batch portion of batch cycle.

The MPC block 560 may help keep the net production rate from falling off. Thus, the MPC block 560 may result in a product concentration that increases with a constant slope, and may result in a shorter batch cycle time. Additionally, because the product concentration increases with a constant slope, estimation of the time at which the batch will complete should be relatively accurate. One of ordinary skill in the art will recognize may variations are possible with the system 500. As just one example, if it is desirable to decrease the biomass concentration profile near the end of the batch in order to decrease substrate consumption rate and free up the controller to better maintain the net production rate, the set point for the growth rate could be decreased as the product concentration approached its end point.

To predict the amount of time left in a batch produced by the system 500, a difference between a current product concentration and an endpoint concentration may be divided by a factored net production rate. This may then be added to a current batch time to generate a predicted batch cycle time. A glucose consumption can be predicted by taking the time left in the batch, multiplied by a factored glucose feed rate, and adding it to the current glucose totalized charge. A product end point concentration may be divided by a predicted glucose consumption to generate a predicted yield in terms of kilograms of product per kilograms of glucose. A predicted yield may then be expressed as a percent of a difference between the minimum and maximum practical yield.

Of course, the system 500 of FIG. 10 is merely one example of a biochemical batch process system that can utilize techniques described above. Other examples, include systems for producing other antibiotics, complex proteins, growth hormones, antibodies, pharmaceuticals, additives, beer, wine, polymers, lubricants, specialty chemicals, etc.

Different embodiments of the techniques and systems described herein may be utilized in a variety of ways. For example, systems such as the system shown in FIG. 2, the virtual plant 304, etc., may be used to develop strategies for controlling and/or handling, normal batch operation and/or abnormal situations. Such systems also may be used to develop strategies for detecting abnormal situations. Further, embodiments of the techniques and systems described herein may be used to identify, predict, and/or achieve batch profiles that meet economic objectives. End points of a batch may be predicted and/or the batch process may be controlled to increase capacity and/or quality. The batch cycle time may be predicted and/or the batch process may be controlled to decrease the batch cycle time. Identified profiles may be saved and used to detect and/or quantify changes in batch operating conditions, raw materials (e.g., trace nutrients, additives, etc.). Profiles may be a priori analyzed by tools such as multivariate statistical process control, etc.

Various multiple input/multiple output control systems were described herein, such as MPC blocks. One of ordinary skill in the are will recognize that various multiple input/multiple output control systems, including known systems, may be utilized in various implementations of the techniques described herein. For example, the following commonly assigned patents and patent applications describe techniques and systems that optionally may be utilized. Each of the following commonly assigned patents and patent applications is hereby incorporated by reference herein in its entirety for all purposes. U.S. Pat. No. 6,445,963 describes advanced control blocks that implement multiple input/multiple output control as well as techniques for creating and configuring such control blocks. U.S. Pat. No. 6,721,609 describes multiple input/multiple output control blocks that implement optimizing control logic to ensure that manipulated variables do not exceed or violate constraints. U.S. Pat. No. 6,901,308 describes multiple input/multiple output control blocks that include a compensation block or algorithm to change the execution period of the multiple input/multiple output control block for different operating regions of a process. U.S. patent application Ser. No. 10/241,350 describes multiple input/multiple output control blocks that include an optimization routine that calculates optimal operating targets for manipulated variables. U.S. patent application Ser. No. 10/454,937 describes multiple input/multiple output control blocks that include a linear process model to model the controlled process and a non-linear process model to generate corrections to predictions of the linear process model. This may improve control of processes having non-linear characteristics.

The multiple input/multiple output control systems, first principles models, control routines, method blocks, etc., described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer or processor, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for controlling a batch process, comprising:
   generating an estimate of an unmeasurable real-time parameter of a batch process using a first principles model;
   providing the estimate to a process control routine for controlling the batch process;
   generating signals based on the estimate, using the process control routine, to control the batch process; and
   using a control routine to update at least one parameter of the first principles model based on comparisons of outputs of the first principles model and measurements from the batch process.

2. A method according to claim 1, further comprising:
   generating one or more additional estimates of additional unmeasurable real-time parameters of the batch process using the first principles model;
   providing the one or more additional estimates to the process control routine;
   wherein generating the signals to control the batch process comprises generating the signals based on the estimate and the one or more additional estimates using the process control routine.

3. A method according to claim 1, further comprising:
   providing one or more measured batch process parameters to the process control routine;
   wherein generating the signals to control the batch process comprises generating the signals based on the estimate and the one or more measured batch process parameters using the process control routine.

4. A method according to claim 1, wherein the process control routine comprises a multiple-input/multiple output control routine.

5. A method according to claim 4, wherein the process control routine comprises a model predictive control routine.

6. A method according to claim 1, wherein generating the estimate of the unmeasurable real-time parameter comprises generating an estimate of a rate of change of a component of the batch process.

7. A method according to claim 1, wherein generating signals to control the batch process comprises at least one of:
   generating signals to control a hold time associated with the batch process;
   generating signals to control a rate of change of a parameter associated with the batch process; or
   generating signals to control a batch cycle time associated with the batch process.

8. A method according to claim 1, wherein generating the signals to control the batch process comprises generating a set point for use by another process control routine;
   the method further comprising providing the set point to the another process control routine.

9. A system for controlling a batch process, comprising:
   a computer readable medium;
   a first principles model configured to generate at least one estimate corresponding to at least one unmeasurable real-time parameter of a batch process;
   a first multiple input/multiple output control routine stored on the computer readable medium and configured to receive the at least one estimate from the first principles model and to generate control signals for controlling the batch process based on the at least one estimate; and
   a second multiple input/multiple output control routine stored on the computer readable medium and configured to update parameters of the first principles model based on comparisons of outputs of the first principles model and measurements from the batch process.

10. A system according to claim 9, wherein the first multiple input/multiple output control routine comprises a model predictive control routine.

11. A system according to claim 9, wherein the first multiple input/multiple output control routine is communicatively coupled to receive at least one measured parameter of the batch process, the first multiple input/multiple output control routine configured to generate the control signals for controlling the batch process based on the at least one estimate and the at least one measured parameter.

12. A system according to claim 9, wherein the control signals generated by the first multiple input/multiple output control routine are communicatively coupled to inputs of the first principles model.

13. A system according to claim 9, further comprising a third multiple input/multiple output control routine stored on the computer readable medium and configured to receive the at least one estimate from the first principles model and to generate control signals for controlling the batch process based on the at least one estimate, wherein control signals generated by the third multiple input/multiple output control routine are communicatively coupled to inputs of the first principles model.

14. A method for facilitating control of a batch process, comprising:
   providing control outputs of a multiple input/multiple output control routine to inputs of a first model of the batch process, the first model being a first principles model;
   providing estimates generated by the first principles model of the batch process to the multiple input/multiple output control routine;
   generating a second model of the batch process for use by the multiple input/multiple output control routine based on the estimates generated by the first principles model and not based on measurements from the batch process; and
   utilizing the generated second model to control the batch process.

15. A method according to claim 14, further comprising utilizing the multiple input/multiple output control routine to control the batch process, wherein the multiple input/multiple output control routine utilizes the generated second model in controlling the batch process.

16. A method according to claim 14, further comprising communicating the generated second model to another multiple input/multiple output control routine utilized to control the batch process, wherein the other multiple input/multiple output control routine utilizes the generated second model to control the batch process.

17. A method according to claim 14, further comprising utilizing the multiple input/multiple output control routine and the first principles model to test control strategies for controlling the batch process.

18. A method according to claim 14, wherein the multiple input/multiple output control routine comprises a model predictive control routine.

19. A method according to claim 14, wherein providing estimates generated by the first principles model of the batch process to the multiple input/multiple output control routine comprises providing at least one estimate of an unmeasurable real-time parameter of the batch process.

20. A system for facilitating control of a batch process, comprising:
   a computer readable medium;
   a first model of a batch process being a first principles model, the first principles model configured to generate signals corresponding to parameters of the batch process; and
   a multiple input/multiple output control routine stored on a computer readable medium and having a second model of the batch process for use by the multiple input/multiple output control routine to control the batch process, wherein the second model is generated based on signals received from the first principles model and not based on measurements from the batch process, the multiple input/multiple output control routine to provide control signals to inputs of the first principles model and to receive outputs generated by the first principles model.

21. A system according to claim 20, wherein the first principles model is configured to generate an estimate of an unmeasurable real-time parameter of the batch process;
   wherein the multiple input/multiple output control routine is communicatively coupled to the first principles model to receive the estimate of the unmeasurable real-time parameter.

22. A system according to claim 20, wherein the multiple input/multiple output control routine comprises:
   a signal generator communicatively coupled to inputs of the first principles model, the signal generator configured to generate excitation signals; and
   a data collector communicatively coupled to outputs of the first principles model, the data collector configured to collect outputs of the first principles model generated in response to the excitation signals.

23. A system according to claim 20, wherein the multiple input/multiple output control routine comprises a model predictive control routine.

24. A method for updating a model of a batch process, comprising:
   providing measurements associated with a batch process as inputs to a multiple input/multiple output control routine;
   providing estimates generated by a first principles model of the batch process as inputs to the multiple input/multiple output control routine; and
   updating parameters of the first principles model using outputs generated by the multiple input/multiple output control routine.

25. A method according to claim 24, wherein the multiple input/multiple output control routine comprises a model predictive control routine.

* * * * *

UNITED STATES PATENT AND TRADEMARK OFFICE
CERTIFICATE OF CORRECTION

| | | |
|---|---|---|
| PATENT NO. | : 7,877,154 B2 | Page 1 of 1 |
| APPLICATION NO. | : 11/241157 | |
| DATED | : January 25, 2011 | |
| INVENTOR(S) | : Terrence L. Blevins et al. | |

It is certified that error appears in the above-identified patent and that said Letters Patent is hereby corrected as shown below:

At Column 15, line 67, "inputs" should be -- input --.

At Column 16, line 52, "inthe" should be -- in the --.

At Column 20, line 8, "may" should be -- many --.

At Column 20, line 54, "are" should be -- art --.

Signed and Sealed this
Thirteenth Day of September, 2011

David J. Kappos
*Director of the United States Patent and Trademark Office*